United States Patent Office 3,288,708
Patented Nov. 29, 1966

3,288,708
PROCESS FOR TREATING SEWAGE WITH IODINE
Harry J. Cordle, East Orange, N.J., and Alfred C. Loonam, New York, N.Y., assignors to Chilean Nitrate Sales Corporation, New York, N.Y., a corporation of New York
No Drawing. Filed Nov. 27, 1964, Ser. No. 414,458
6 Claims. (Cl. 210—62)

This invention relates, in general, to a process for the treatment of sewage and, more particularly, to a process wherein elemental (diatomic) iodine is the active germicidal and bactericidal agent for the rendering of sewage materials bacteriologically safe for discharge. A feature of the process is the regeneration of active iodine after initial, sanitizing reaction with sewage, so that actual consumption of iodine is minimized. While the invention has general applicability to the treatment of sewage, it is particularly useful in marine applications.

The progress of water pollution control over the past few years has been encouraging, in that there is now reduced direct discharge of untreated sewage into rivers, lakes and streams, by neighboring communities, albeit problems such as detergent pollution are still to be solved. Of growing concern to public health authorities, however, is the direct discharge into these same rivers, lakes and harbors of untreated or poorly treated sewage from vessels of all kinds. While this problem is most serious in the major ports of the country where tens or hundreds of ships are present every day, it is not unknown in even small yacht harbors, where the recent vast increase in pleasure boating has given rise to serious pollution problems, particularly on summer weekends. Of course, the same factors which make a harbor safe for boats also prevent circulation and dilution of sewage.

The problem is most acute, of course, with large ocean liners and naval vessels, due to the populations involved, and what treatment facilities as have been tried heretofore have generally been limited to these ships and to small pleasure craft. Treatment has commonly been limited to heavy chlorination of wastes while the ships are in port or in inland or other fresh waters, and this has not proven entirely satisfactory. The large amounts of ammonia compounds in sewage results in production of various chloramines, with a consequent reduction of chlorine efficiency as a disinfectant.

The use of iodine as a disinfecting and sanitizing agent is well known in such areas as antiseptics, sanitization of food handling equipment and swimming pools, treatment of drinking water and the like. Of the six forms of iodine that can be found in aqueous media, namely, iodide ($I^-$), diatomic iodine ($I_2$), triiodide ($I_3^-$), hypoiodus acid (HIO), hpyoiodite ($OI^-$) and iodate ($IO_3^-$), it is generally known that diatomic iodine has by far the greatest bactericidal activity, and hypoiodous acid possesses substantial activity. The latter compound, however, is unstable except under carefully controlled conditions of pH and concentration, and will not be formed when, as in sewage treatment, concentrations of disinfectant must necessarily be quite large.

One of the most troublesome problems with iodine-based disinfectants has been sustaining the germicidal and bactericidal action over a period of time due primarily to the tendency of iodine to be reduced to iodide.

It is therefore an object of the present invention to provide an iodine-based sewage treatment process which overcomes the foregoing deficiencies of prior art processes.

A further object of the invention is to provide an iodine-based sewage treatment process wherein iodine consumption is minimized.

Another object of the invention is to provide an iodine-based sewage treatment process particularly adapted to small communities and/or marine applications.

Still another object of the present invention is to provide a cyclic, iodine-based sewage treatment process wherein active iodine is regenerated after reaction with the sewage.

Various other objects and advantages of the present invention will become clear in the course of the following description of several embodiments thereof, and the novel features will be particularly pointed out in connection with the appended claims.

In essence, the process of the invention is based on supplying elemental iodine, either as such or by reaction of an iodide with an iodate, in the presence of sewage to be treated, in an acidic solution, and in the presence of a substantial stoichiometric excess of iodate. Regardless of the particular reaction mechanism which may be involved it has been found that iodine is maintained in the free state if the necessary excess of iodate is present under the conditions prescribed. It has also been found necessary to comminute and agitate the mixture in order to insure complete reaction in a reasonable time (as used herein, complete reaction means bringing coliform counts down to acceptable limits).

The use of a substantial excess of iodate, under the particular conditions of sewage treatment, and resultant prolonged maintenance of available iodine, is a novel and important feature of the present invention.

Two practical problems of operation according to the invention are insuring complete reaction within a limited time, and the problem of corrosion at an operating pH range of about 2.5–4.0. The first can be met by vigorous agitation and comminution within the reaction tank; injection of the reactants into the turbulent flow of sewage through the pipe on the way to the tank is also beneficial. Addition of a low-foaming wetting agent also has a beneficial effect, as it will favor increased penetration and contact of the reactants with solids. The second problem can be met by the obvious expedient of using acid-resistant lining materials within the reaction tank and discharge equipment, or, employing acidic materials with corrosion-inhibiting properties such as, for example, hemisodium phosphate ($NaH_5(PO_4)_2$). Such a material deposits an acid-resistant coating on the tank walls which reduces attack on the wall material.

The mode of operation employed will depend generally on the size of the installation. Thus, on an ocean-going passenger vessel a reaction tank of, say 9000 gallon capacity will be fed more or less continuously, with a level controller determining operation of the discharge valve situated in the bottom of the tank. A saturated iodine solution and iodate, or an iodide and iodate as powders or in solution, are metered in appropriate ratios and quantities, together with the acidic material. It is to be noted that when iodide, iodate and acidic material are used, through the mechanism of the initial reaction approximately one-sixth of the liberated iodine comes from the added iodate, the remainder of the iodate serving to keep the iodine in the free state. In any event, the iodate serves as a reservoir of iodine values which are released as free iodine as the iodate is reduced.

Where iodide and iodate are the active raw materials, tests have indicated that satisfactory results require an amount of iodate that is at least four times the stoichiometric quantity required to initially react with iodide in order to get the best possible conversion of reacted iodide back to active iodine. When elemental iodine (in solution) is used to replace the initial iodide, the amount of iodate added can be about the same.

In smaller installations, such as for example on pleasure boats, the reagents can be supplied in tableted, powder or liquid form and metered into a small tank with each use of the sanitary facilities. Discharge from the tank is conveniently regulated to lag behind the input so that sufficient reaction time is available. Of course, with a small installation usage may vary greatly, so as a general rule reagent concentrations should be increased, since retention time will be related to flushing frequency.

An alternative method of the invention involves the use of a chlorine compound to release the iodine. As noted above, chlorine forms chloramines with the ammonia compounds in sewage. This is a disadvantage in chlorination systems, but is an advantage in the present invention, due to the fact that chloramines will release active iodine from a dissolved iodide as effectively as hypochlorite. Moreover, the chloramines are formed at the point where the iodine is needed—in the sewage—so that the iodine will also be released there. Generally, the chlorine is added as a dissolved hypochlorite, as in conventional systems. It is to be noted that chloramines will release iodine from iodide as effectively as chlorine in other forms.

One skilled in the art will recognise that the iodide-iodate route may be combined with the iodide-hypochlorite route with beneficial effects. It will also be realized that bromide-bromate-acid provides an alternate scheme which may be employed.

In the following specific examples of the invention the other parameters, particularly necessary $I_2$ concentration, are set forth, it being understood that these examples represent tests of particular facets of the invention, and should not be construed in a limiting sense.

EXAMPLE I

The first test was to determine the approximate iodine demand of a sample of domestic sewage (locally obtained). This sewage had been comminuted and degritted, and passed through a bar screen.

In making the first test, the immediate objective was to see if 200 p.p.m. of $I_2$ would give a residual after 10 minutes of contact, it being assumed that at least this much time would be available for disinfection. To 800 ml. of sewage was added 200 ml. of an iodine (and iodide) solution containing 1 mg. $I_2$ per ml. Room and sewage temperature, 25.0–25.5° C. One hundred (100) ml. samples were removed from the mixture after 10 minutes and after the subsequent intervals shown in Table I below, and titrated with 0.01 normal thiosulfate, with the results indicated. One hundred (100) ml. 200 p.p.m. $I_2$ contains 20 mg. $I_2$, equivalent to 15.8 ml. 0.01 normal.

*Table I*

| Time (minutes) | Ml. 0.01 N thiosulfate | Ml. 0.01 N $I_2$ consumed | Percent $I_2$ remaining | $I_2$ remaining, p.p.m. |
|---|---|---|---|---|
| 10 | 11.5 | 4.3 | 73.5 | 145 |
| 20 | 9.6 | 6.2 | 60.8 | 122 |
| 30 | 8.9 | 6.9 | 56.4 | 113 |
| 45 | 8.8 | 7.0 | 55.8 | 112 |
| 60 | 8.1 | 7.7 | 52.4 | 103 |
| 90 | 7.35 | 8.45 | 46.5 | 93 |

The total average solids in this sewage was 536 p.p.m. Clearly, residual $I_2$ levels indicate complete disinfection.

EXAMPLE II

The second test, on a fresh sample of sewage from the same source, was to determine the feasability of disinfecting sewage by adding to the sample a small initial dose of iodide, and an excess of iodate, and an acid to lower the pH sufficiently to cause reaction of the iodide and iodate to liberate iodine.

Having established, in Example I, an approximate value for the iodine demand of this sewage, the second test was based on this value. To 900 ml. of a fresh sample of sewage was added 100 ml. of a KI solution containing 0.131 gram KI per liter; this addition gave a potential $I_2$ concentration of 10 p.p.m. Acid in the form of hemisodium phosphate ($NaH_5(PO_4)_2$) was then added until the pH of the mixture was less than 3.0. At this point there was no color development. An excess of $KIO_3$ was then added; a light, but definite, brownish yellow color developed. One hour later, there was no apparent lessening of color, probably a little deepening, in spite of the known relatively high iodine demand found in this type of sewage in Example I. To a small portion of the treated solution starch was added; a light, but definite blue color resulted, confirming the presence of $I_2$. Room temperature was 26.5° C.; sample temperature was 25.0° C. The total solids in the sample of sewage worked with in this test averaged 490 p.p.m., slightly less than in the sample of Example I.

EXAMPLE III

In this test, the sewage used was human urine, because of its ready availability and ease of handling. The urine was diluted to 2½ times its volume with distilled water, namely 400 ml. to 1,000 ml.

The pH of the dilute mixture was about 6.4 as checked with Hydrion pH paper. To 500 ml. of this solution in a stoppered flask 8.0 ml. 0.1 normal iodine solution (APHA standard solution, containing KI as well, of course) was added, giving a concentration of 200 p.p.m. $I_2$. The brown color thus imparted disappeared completely in 10 minutes; addition of starch to a 100 ml. aliquot produced no color. Accordingly, 6.4 ml. more of the 0.1 normal iodine solution was added to the remaining 400 ml. diluted sewage in the flask. A strong brown color was produced by the addition. At the end of 10 minutes the color was still slightly brown, and a 100 ml. aliquot required 1.40 ml. of 0.01 N thiosulfate for titration. A 100 ml. aliquot after 20 minutes required 0.60 ml. for titration; and a 100 ml. aliquot after 30 minutes, 0.1 ml., which can be considered negligible. Room temperature was 23° C.

If the two increments each of 200 p.p.m. $I_2$ are added, the result is an apparent iodine demand in 30 minutes of about 400 p.p.m. While this figure differs a little from what would have been found if all the $I_2$ had been added at once, the difference is not important here, as the primary concern was to be sure that the liquid being treated did have a substantial iodine demand.

EXAMPLE IV

In this test, the remaining 500 ml. of diluted urine was mixed with 6.6 ml. of KI solution containing 1 mg. KI per ml., giving a concentration of 13.2 p.p.m. KI, equivalent to 10 p.p.m. $I_2$, the same as was used in Example II, though in actual practice a considerably higher initial dose might well be employed. Next hydrochloric acid was added (1:1), a few drops at a time, checking after each addition with pH paper, until a total of 30 drops produced a pH of 2.5 to 3.0.

One-half gram $KIO_3$, was then added, giving a concentration of 1,000 p.p.m. A pale brownish color developed almost immediately and deepened on standing. The color apparently reached its peak within an hour and then began to fade. After 1 hour and 35 minutes the color was estimated to be equivalent to about 50 p.p.m. $I_2$ when compared with a similarly prepared solution from 0.1 normal iodine solution—that is, one containing 50 p.p.m. $I_2$.

EXAMPLE V

Three hundred ml. of fresh urine was diluted to 750 ml. with distilled water to maintain the same 2.5 to 1 ratio employed in the previous examples. For determining the iodine demand, 250 ml. of the diluted urine was utilized. To this volume was added 4.0 ml. of 0.1 normal iodine, giving a concentration of 200 p.p.m. $I_2$. After 10 minutes a 50 ml. aliquot was tested with starch;

no blue color resulted. An additional 3.2 ml. of 0.1 normal iodine was added to the remaining 200 ml. of liquid. After 10 minutes there was no perceptible increase in color, so 3.2 ml. more of 0.1 N iodine solution were added. After 10 minutes a 100 ml. aliquot was tested with starch; still no blue color, so to the remaining 100 ml. aliquot 1.6 ml. 0.1 normal iodine solution was added, which produced a definite brown color. After 10 minutes 50 ml. of this liquid required 0.5 to 0.01 normal thiosulfate for titration. At the end of 30 minutes, the remaining 50 ml. aliquot gave no color when starch was added.

The total dosage of iodine applied to the last 100 ml. of liquid in four increments of 200 p.p.m. each was 800 p.p.m. (neglecting minor changes in volume resulting from the addition of the $I_2$ solution). It may therefore be assumed that the liquid had a 30-minute iodine demand of around 800 p.p.m., although it is realized that a slightly different result might have been obtained if 800 p.p.m. had been applied in one dose.

To the remaining 500 ml. of diluted urine was added 6.6 ml. KI solution containing 1 mg. KI per ml., equivalent to 10 p.p.m. $I_2$. The solution was then acidified with 1:1 hydrochloric acid, 5 drops at a time, until a pH of 2.5 to 3.0 was reached; 60 drops were required. Then, to a 100 ml. aliquot in a 100 ml. graduated cylinder, 0.1000 gram $KIO_3$ was added. A slight brownish color developed immediately and deepened steadily. At the end of ten minutes the color was roughly comparable with that of a solution containing 200 p.p.m. $I_2$ prepared from 0.1 normal iodine, also in a 100 ml. graduated cylinder and backed by another similar cylinder filled with acidified liquid but with no iodate added. After 20 minutes and 25 minutes the two colors seemed to be fully comparable; the peak of color was reached in about 15 minutes. After 30 minutes and 1 hour, there was still very little or no change, possibly a very little fading after the latter interval. After 1.5 hours there was definitely a little fading, but the color was still strong. After 2 hours and 20 minutes, the 200 p.p.m. $I_2$ standard was diluted 50:50 to give a concentration of 100 p.p.m. $I_2$; this was compared with the sample, which was now estimated to contain 125 to 150 p.p.m. $I_2$.

The latter solution was allowed to stand overnight (17 hours); at the end of this time the solution had a definite reddish tinge, but gave no color with starch, even on the addition of $KIO_3$. The pH was still about 2.5. The standard, with 100 p.p.m. $I_2$, still had a strong color after standing over night.

From the foregoing examples, and particularly from the availability of free iodine after relatively short periods of time, it can be concluded that disinfection was complete by the reaction mechanism of the invention (see Witlin and Gershenfeld: "Iodine Sanitizing Solutions," Soap and Chemical Specialties, September-October 1956).

From the foregoing and other tests, the following parameters are felt to be satisfactory for the great majority of practical situations which can arise: 100 p.p.m. of free iodine initially available and a stoichiometric excess of iodate of about 4. For purposes of complete reaction, it has been found that the total suspended solids can be up to 10% (most domestic sewage runs 500 p.p.m. suspended solids or less).

It is to be understood that various changes in the details, steps, materials and arrangements of parts may be made by those skilled in the art without departing from the scope of the invention, as defined in the appended claims.

What is claimed is:
1. A process for treating aqueous sewage containing organic matter comprising:
    (a) treating the sewage with elemental iodine;
    (b) providing within said sewage a water-soluble iodate, said water-soluble iodate being provided to regenerate iodine from iodide which has formed during said treatment, said iodate being provided in an amount that is at least about four times the stoichiometric amount required to react with all the iodide that can be produced from the iodine; and
    (c) maintaining the pH of said sewage at a point where iodide will react with iodate to release elemental iodine.
2. The process of claim 1 wherein the iodine of (a) is formed by reacting a water soluble iodide with a water soluble iodate.
3. The process as claimed in claim 1, wherein step (a) is accomplished by addition to said sewage of an iodine solution.
4. The process of claim 1 wherein the sewage is treated with at least 100 p.p.m. of elemental iodine.
5. The process of claim 4 wherein the pH is maintained below about 4.0.
6. The process of claim 5 wherein the sewage is comminuted and agitated during the treatment.

References Cited by the Examiner
UNITED STATES PATENTS
2,918,400   12/1959   Loonam _____ 167—17

OTHER REFERENCES

Ingram, W. T.: An Investigation of the Treatment of Cabin Cruiser Wastes, Sewage and Industrial Wastes, vol. 28, January 1956, pp. 93–99.

MORRIS O. WOLK, *Primary Examiner.*

MICHAEL E. ROGERS, *Examiner.*

UNITED STATES PATENT OFFICE
CERTIFICATE OF CORRECTION

Patent No. 3,288,708

November 29, 1966

Harry J. Cordle et al.

It is hereby certified that error appears in the above numbered patent requiring correction and that the said Letters Patent should read as corrected below.

Column 1, line 52, for "hpyoiodite" read -- hypoiodite --; column 6, line 25, for "reach" read -- react --.

Signed and sealed this 12th day of September 1967.

(SEAL)
Attest:

ERNEST W. SWIDER
Attesting Officer

EDWARD J. BRENNER
Commissioner of Patents